US012774584B2

(12) United States Patent
Nishikori et al.

(10) Patent No.: US 12,774,584 B2
(45) Date of Patent: Oct. 27, 2026

(54) ELECTRIC CONSTRUCTION MACHINE

(71) Applicant: Yanmar Holdings Co., Ltd., Osaka (JP)

(72) Inventors: Shu Nishikori, Osaka (JP); Kensuke Kaneda, Chikugo (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 280 days.

(21) Appl. No.: 17/928,924

(22) PCT Filed: May 10, 2021

(86) PCT No.: PCT/JP2021/017671
§ 371 (c)(1),
(2) Date: Nov. 30, 2022

(87) PCT Pub. No.: WO2021/246110
PCT Pub. Date: Dec. 9, 2021

(65) Prior Publication Data
US 2023/0228059 A1 Jul. 20, 2023

(30) Foreign Application Priority Data
Jun. 2, 2020 (JP) ................................ 2020-095887

(51) Int. Cl.
*E02F 9/20* (2006.01)
*B60K 11/04* (2006.01)
(Continued)

(52) U.S. Cl.
CPC ............ *E02F 9/2095* (2013.01); *B60K 11/04* (2013.01); *E02F 9/0866* (2013.01); *E02F 9/226* (2013.01);
(Continued)

(58) Field of Classification Search
CPC ....... E02F 9/2095; E02F 9/0866; E02F 9/226; E02F 9/207; E02F 3/325; E02F 9/2091;
(Continued)

(56) References Cited

U.S. PATENT DOCUMENTS

2006/0062678 A1* 3/2006 Furuta .................. E02F 9/2095 417/42
2009/0164048 A1* 6/2009 Kyuma ..................... F01P 7/08 700/275
(Continued)

FOREIGN PATENT DOCUMENTS

JP 2014-084569 A 5/2014
JP 2015-197029 A 11/2015
(Continued)

OTHER PUBLICATIONS

International Search Report dated Jun. 1, 2021 issued in corresponding PCT Application PCT/JP2021/017671 cites the patent documents above.

(Continued)

*Primary Examiner* — Navid Z. Mehdizadeh
*Assistant Examiner* — Caitlin R Mccleary
(74) *Attorney, Agent, or Firm* — NORTON ROSE FULBRIGHT US LLP

(57) ABSTRACT

An electric construction machine includes a driving system configured to drive a machine body under electric power, a heat exchange device configured to exchange heat of a cooling medium for cooling the driving system, a cooling fan configured to send air for cooling the heat exchange device, and a cooling fan control unit configured to control the rotation of the cooling fan according to a set operating mode. The operating mode includes a driving mode in which the driving system is driven and a charging mode in which the driving of the driving system is stopped to charge a
(Continued)

battery configured to store electric power. The cooling fan control unit is configured to set the rotation rate of the cooling fan in the charging mode to a charging mode rotation rate that corresponds to the driving state of the driving system.

18 Claims, 10 Drawing Sheets

(51) Int. Cl.
*E02F 9/08* (2006.01)
*E02F 9/22* (2006.01)
*F15B 13/04* (2006.01)
*F15B 15/18* (2006.01)

(52) U.S. Cl.
CPC .............. *F15B 13/04* (2013.01); *F15B 15/18* (2013.01); *B60L 2200/40* (2013.01); *B60L 2260/40* (2013.01); *F15B 2211/62* (2013.01)

(58) Field of Classification Search
CPC ......... E02F 9/2264; B60K 11/04; B60K 1/04; B60K 2001/0416; B60K 11/02; F15B 13/04; F15B 15/18; F15B 2211/62; B60L 2200/40; B60L 2260/40; B60Y 2200/41; B60Y 2200/412
See application file for complete search history.

(56) References Cited

U.S. PATENT DOCUMENTS

2013/0078071 A1* 3/2013 Noguchi .................. B60K 1/04 414/719
2015/0207359 A1* 7/2015 Ok ............................ H02J 7/14 320/101
2019/0241060 A1* 8/2019 Hara ..................... E02F 9/2095
2020/0406783 A1* 12/2020 Tokozakura ........ H01M 10/633
2023/0228059 A1 7/2023 Nishikori et al.

FOREIGN PATENT DOCUMENTS

| | | |
|---|---|---|
| JP | 2020-051065 A | 4/2020 |
| JP | 2021-188407 A | 12/2021 |
| WO | 2012/081620 A1 | 6/2012 |
| WO | 2019/208370 A1 | 10/2019 |

OTHER PUBLICATIONS

Japanese Office Action dated Jul. 16, 2024 issued in JP Application No. 2024-004648.

* cited by examiner

WHEN COOLING WATER TEMPERATURE
≤ THRESHOLD

WHEN COOLING WATER TEMPERATURE
> THRESHOLD

ELECTRIC CONSTRUCTION MACHINE

CROSS-REFERENCE TO RELATED APPLICATIONS

This application is a national stage application pursuant to 35 U.S.C. § 371 of International Application No. PCT/JP2021/017671, filed on May 10, 2021, which claims priority under 35 U.S.C. § 119 to Japanese Patent Application No. 2020-095887 filed on Jun. 2, 2020, the disclosures of which are hereby incorporated by reference in their entireties.

TECHNICAL FIELD

The present invention relates to an electric construction machine.

BACKGROUND ART

Conventionally, there has been proposed an electric construction machine provided with an electric motor driven by electric power from an external power source. For example, Patent Literature 1 discloses a technology where a second cooling fan is provided separately from a first cooling fan that is driven by an electric motor and that cools a heat exchange device, and the second cooling fan, at the time of stopping the electric motor, is driven thereby to cool a control panel.

CITATION LIST

Patent Literature

Patent Literature 1: Japanese Unexamined Patent Application Publication No. 2014-84569

DISCLOSURE OF INVENTION

Problems to be Solved by the Invention

By the way, it is conceivable that the electric construction machine is configured to use, for example, a rechargeable battery as a drive source for the electric motor, other than the external power source. In the electric construction machine provided with the battery, the electric power supplied from the battery or the external power source builds up a driving system that drives a machine body. Then, as an operating mode of the driving system, other than a driving mode to drive the driving system, a charging mode that stops the driving of the driving system and charges the battery can be provided.

However, no proposal is yet to be made, including the Patent Literature 1, for the cooling fan's rotation control in the charging mode. In particular, no proposal for the cooling fan's rotation control in the charging mode has been conventionally made at all, where the rotation control takes into account the driving state (for example, a load seen at the time of driving the electric motor) of the driving system which was being driven in the driving mode.

The present invention has been made to solve the above problem, and an object of which is to provide an electric construction machine that, in view of a driving system's driving state, properly controls a cooling fan's rotation in a charging mode, thereby making it possible to accomplish an effect that corresponds to the driving system's driving state.

Means for Solving the Problems

An electric construction machine according to one aspect of the present invention, includes: a driving system that drives the machine body by electric power; a heat exchange device that exchanges heat of a cooling medium for cooling the driving system; a cooling fan that sends air for cooling the heat exchange device; and a cooling fan control unit that controls the cooling fan's rotation according to a set operating mode, wherein the operating mode includes: a driving mode that drives the driving system, and a charging mode that stops the driving of the driving system and charges a battery that stores electric power, and the cooling fan control unit sets the cooling fan's rotation rate in the charging mode to a charging mode rotation rate that corresponds to the driving system's driving state.

Effect of the Invention

The above configuration can accomplish an effect that corresponds to the driving system's driving state.

DESCRIPTION OF EMBODIMENTS

The following is a description of an embodiment of the present invention based on the drawings.

[1. Electric Construction Machine]

Figure 1:
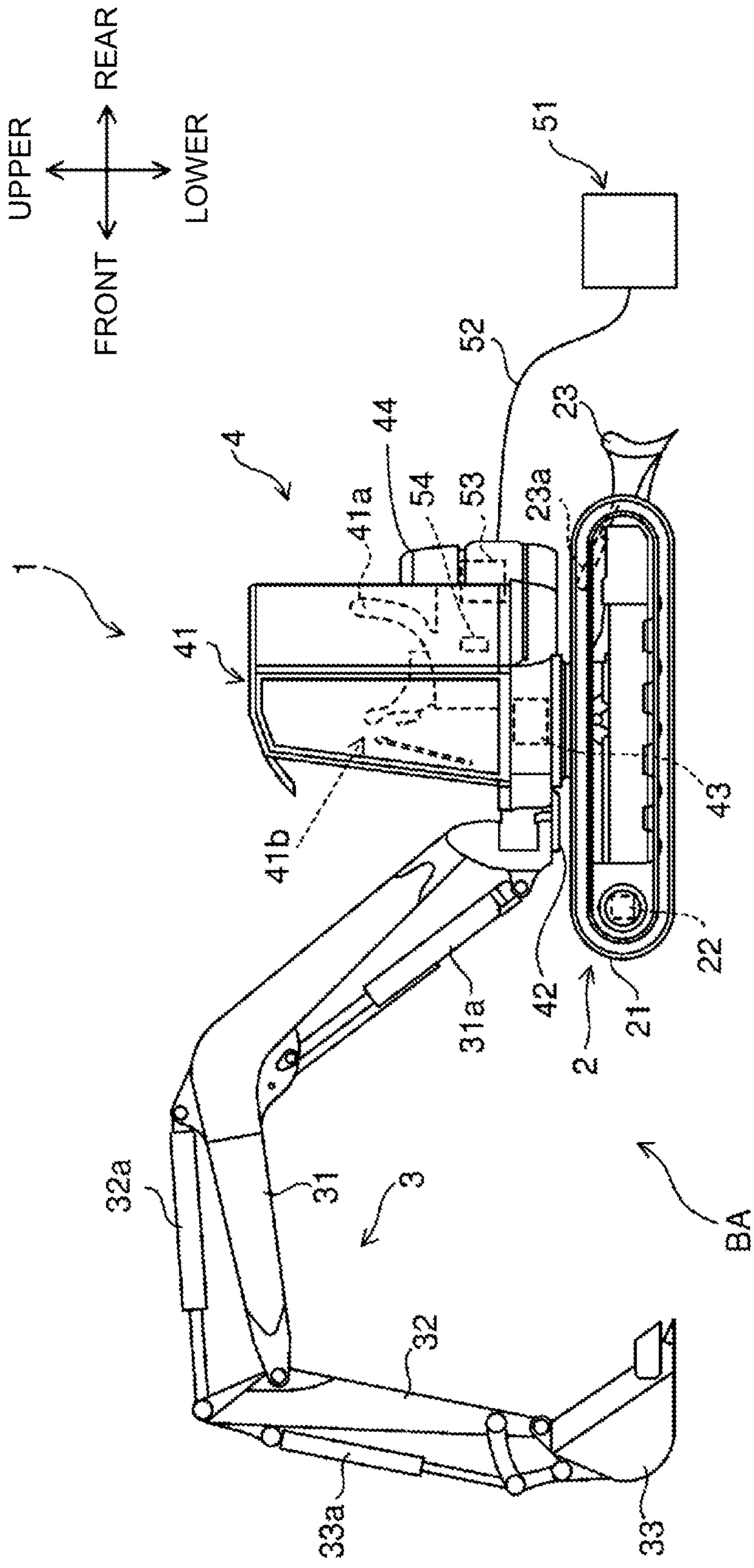
FIG. 1 A side view showing a schematic configuration of a hydraulic shovel which is an example of an electric construction machine according to an embodiment of the present invention.

FIG. 1 is a side view showing a schematic configuration of a hydraulic shovel 1 which is an example of an electric construction machine according to the present embodiment. Further, the electric construction machine is not limited to the hydraulic shovel 1, and may be another vehicle such as a wheel loader. The hydraulic shovel 1 includes a lower travel body 2, a work instrument 3, and an upper swing body 4.

Here, in FIG. 1, directions are defined as follows. First, the direction in which the lower travel body 2 linearly travels is a front/rear direction, one side of which is "front" and the other side is "rear". In FIG. 1, a travel motor 22 side relative to a blade 23 is shown as "front", as an example. A transverse direction perpendicular to the front/rear direction is a right/left direction. In this case, the left side is "left" and the right side is "right" as viewed from an operator (manipulator, driver) seated on an operator seat 41*a*. Further, the gravity direction perpendicular to the front/rear and right/left directions is referred to as an up/down direction, with the upstream side of the gravity direction being "up" and the downstream side being "down".

(Lower Travel Body)

The lower travel body 2 is provided with a pair of crawlers 21 on right and left and a pair of travel motors 22 on right and left. Each of the travel motors 22 is a hydraulic motor. The right and left travel motors 22 drive the right and left crawlers 21, respectively, thereby making it possible to move the hydraulic shovel 1 forward and rearward. The lower travel body 2 is provided with a blade 23 for ground leveling work, and a blade cylinder 23*a*. The blade cylinder 23*a* is a hydraulic cylinder that rotates the blade 23 in the up/down direction.

(Work Instrument)

The work instrument 3 has a boom 31, an arm 32, and a bucket 33. The boom 31, the arm 32, and the bucket 33 are independently driven, thereby making it possible to perform excavating work of earth, sand, etc.

The boom 31 is rotated by a boom cylinder 31*a*. The boom cylinder 31*a* has a base end portion thereof supported by a front portion of the upper swing body 4, and is movable freely in an extendable and retractable manner. The arm 32 is rotated by an arm cylinder 32*a*. The arm cylinder 32*a* has a base end portion thereof supported by a tip portion of the boom 31, and is movable freely in an extendable and retractable manner. The bucket 33 is rotated by a bucket cylinder 33*a*. The bucket cylinder 33*a* has a base end portion thereof supported by a tip portion of the arm 32, and is movable freely in an extendable and retractable manner. The boom cylinder 31*a*, the arm cylinder 32*a*, and the bucket cylinder 33*a* each include a hydraulic cylinder.

(Upper Swing Body)

The upper swing body 4 is configured to be swingable relative to the lower travel body 2 via a swing bearing (not shown). In the upper swing body 4, an operation unit 41, a swing frame 42, a swing motor 43, an engine chamber 44, etc. are placed. Details of the interior of the engine chamber 44 are to be described below. Driving of the swing motor 43 as a hydraulic motor swings the upper swing body 4 via the swing bearing.

A plurality of hydraulic pump 71 (see FIG. 2) is placed in the upper swing body 4. The respective hydraulic pumps 71 are driven by an electric motor 63 (see FIG. 2) inside the engine chamber 44. The respective hydraulic pumps 71 supply hydraulic oil (pressure oil) to the hydraulic motors (for example, right and left travel motors 22, swing motor 43), and the hydraulic cylinders (for example, blade cylinder 23*a*, boom cylinder 31*a*, arm cylinder 32*a*, and bucket cylinder 33*a*). The hydraulic motor and hydraulic cylinder that are driven with the hydraulic oil supplied from any of the hydraulic pumps 71 are collectively referred to as a hydraulic actuator 73 (see FIG. 4).

The operator seat 41*a* is placed in the operation unit 41. Various levers 41*b* are placed around the operator seat 41*a*. The operator seated on the operator seat 41*a* and operating the lever 41*b* drives the hydraulic actuator 73. This allows the lower travel body 2 to travel, the blade 23 to perform the ground leveling work, the work instrument 3 to perform the excavation work, and the upper swing body 4 to swing, etc.

Further, the upper swing body 4 is provided with an unshown power feed port. Via a power feed cable 52, the above power feed port is connected with a commercial power source 51 as an external power source. This allows the electric motor 63 to be driven by the power supplied from the commercial power source 51. Further, supplying the power, which is supplied from the commercial power source 51, to a battery 53 (for example, lithium-ion battery) that is detachably mounted to the upper swing body 4 can charge the battery 53.

Other than the battery 53, a dedicated fan drive power supply 54 that drives a cooling fan F (see FIG. 2), which is described below, is detachably mounted to the upper swing body 4. The fan drive power supply 54 includes a lead battery that outputs a DC voltage of 12 V, for example. The battery 53 and the fan drive power supply 54 (lead battery) can be replaced with new ones in case their performance degrades due to long-term use or service life.

The lower travel body 2, the work instrument 3, and the upper swing body 4 may be so configured as to include an electric travel motor, an electric cylinder, and an electric swing motor. In this case, the lower travel body 2, the work instrument 3, and the upper swing body 4 can all be driven by electric power without using a hydraulic device. That is, when the lower travel body 2, the work instrument 3, and the upper swing body 4 are collectively referred to as a machine body BA, the machine body BA may be driven only by electric power (all electric) or by a combination of the electric power and the hydraulic device. Therefore, it can be said that the hydraulic shovel 1 of the present embodiment is a configuration that includes the machine body BA driven at least by electric power.

[2. Internal Configuration of Engine Chamber]

Figure 2:
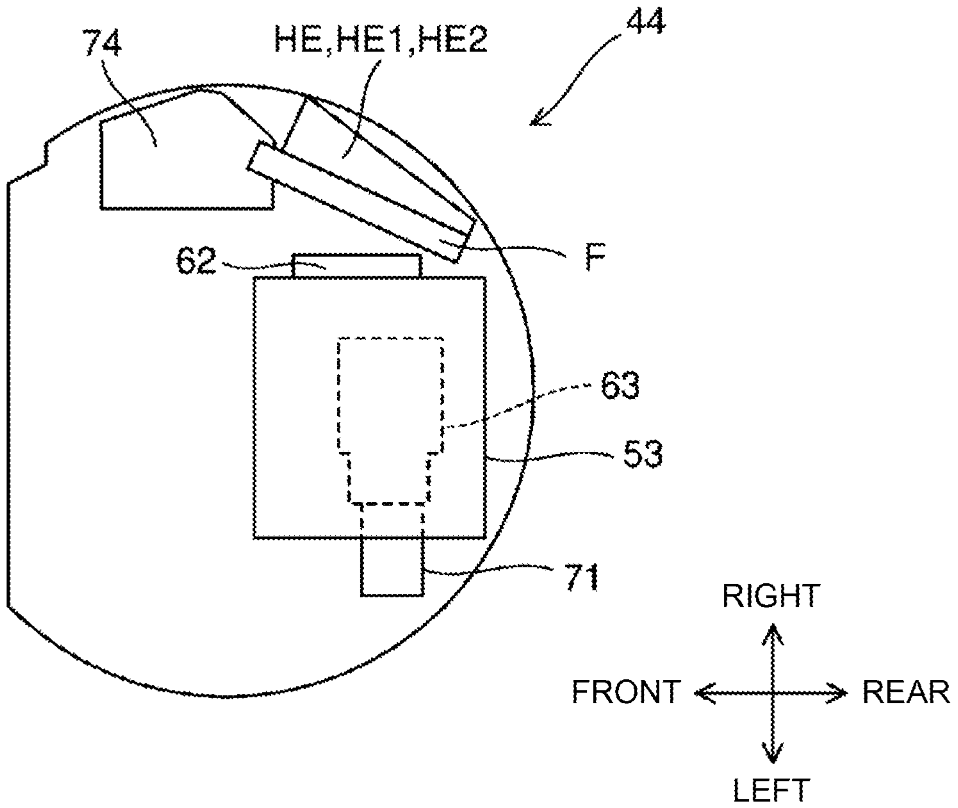
FIG. 2 A plan view schematically showing a brief configuration of the inside of an engine chamber of the above hydraulic shovel.

FIG. 2 is a plan view schematically showing a brief configuration of the inside of the engine chamber 44. For convenience sake, FIG. 2 does not show the top of the engine chamber 44, and shows only one hydraulic pump 71. Inside the engine chamber 44, there are provided an inverter 62, an electric motor 63, a heat exchange device HE, the cooling fan F, a hydraulic oil tank 74 etc., other than the battery 53 and hydraulic pump 71 described above. The hydraulic oil tank 74 tanks hydraulic oil for driving the hydraulic actuators 73. Further, a power feeder 61 (see FIG. 3) is placed in the engine chamber 44.

(Power Feeder, Inverter)

Into the DC voltage, the power feeder 61 converts the AC voltage supplied from the commercial power source 51 via the power feed cable 52. Into the AC voltage, the inverter 62 converts the DC voltage output from the power feeder 61 or supplied from the battery 53, thereby to supply the AC voltage to the electric motor 63.

In the driving mode described below, the AC voltage output from the inverter 62 is supplied to the electric motor 63 thereby to drive the electric motor 63. Meanwhile, in the charging mode described below, the DC voltage output from the power feeder 61 is supplied to the battery 53, thereby to charge the battery 53.

(Electric Motor)

The electric motor 63 is driven by electric power supplied from at least one of the commercial power source 51 and the battery 53 via the inverter 62. The electric motor 63 is placed in the engine chamber 44 so that a rotary shaft of the motor is in the right/left direction, for example, but is not limited to this placement. The above battery 53 is placed above the electric motor 63. In addition, the operator seat 41*a* is placed above the battery 53 via a seat mount. The positional relation between the electric motor 63 and the battery 53 is not limited to the above example.

The hydraulic pumps 71 is connected to the rotary shaft (output shaft) of the electric motor 63. Via a hydraulic valve 72 (see FIG. 4) to the hydraulic actuator 73, the hydraulic pump 71 supplies the hydraulic oil in the hydraulic oil tank 74.

(Heat Exchange Device)

In the engine chamber 44, the heat exchange device HE is placed opposite the hydraulic pump 71, with respect to the electric motor 63. The heat exchange device HE is so configured as to include a first heat exchange device HE1 and a second heat exchange device HE2.

<<First Heat Exchange Device>>

The first heat exchange device HE1 includes a radiator that performs heat exchange for a cooling medium. The cooling medium circulates in a circulation path through the electric motor 63, etc., thereby to cool the electric motor 63, etc. In the present embodiment, water (hereinafter referred to as "cooling water") is used as the cooling medium, but any medium (for example, oil) other than water may also be used.

Figure 3:
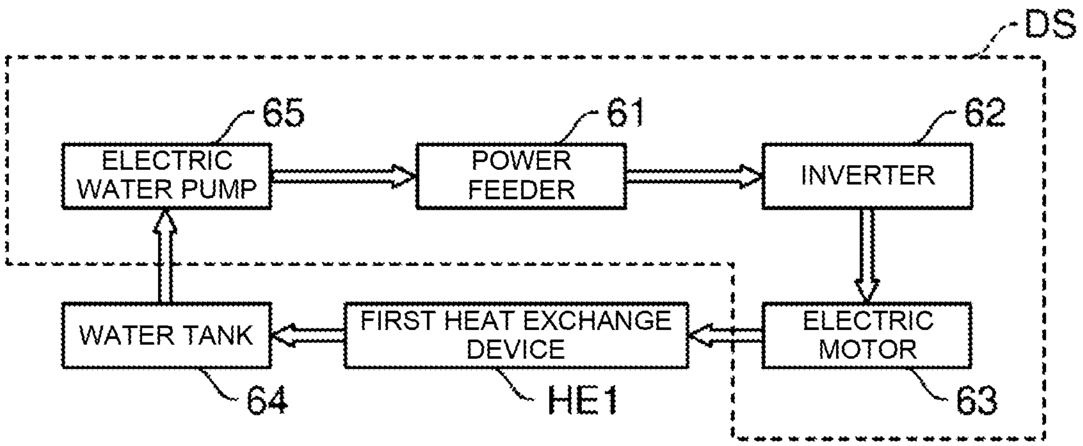
FIG. 3 An explanatory view showing a cooling water circulation path in the above hydraulic shovel.

FIG. 3 is an explanatory view showing the circulation path of the cooling water. The cooling water circulates the power feeder 61, the inverter 62, the electric motor 63, the first heat exchange device HE1, a water tank 64, and an electric water pump 65, in that order. In the first heat exchange device HE1, hot cooling water supplied from the electric motor 63 is cooled by heat exchange with blown air from the cooling fan F and is returned to the water tank 64. Circulating the cooling water can cool a device such as the electric motors 63.

The power feeder 61, the inverter 62, the electric motor 63, and the electric water pump 65 constitute a driving system DS that drives the machine body BA (see FIG. 1) by electric power. That is, the hydraulic shovel 1 as the electric construction machine of the present embodiment is provided with the driving system DS that drives the machine body BA by electric power. And, the hydraulic shovel 1 is provided with the heat exchange device HE (for example, the first heat exchange device HE1) that performs heat exchange of the cooling medium for cooling the driving system DS.

In the present embodiment, the power feeder 61, the inverter 62, and the electric motor 63 which are included in the driving system DS are all water-cooled, but may be partly air-cooled. For example, the electric motor 63 may be air-cooled and the inverter 62 may be water-cooled.

<<Second Heat Exchange Device>>

The second heat exchange device HE2 includes an oil cooler that performs heat exchange for the hydraulic oil used to drive the hydraulic actuator 73. Like the cooling water, the hydraulic oil also circulates through the circulation path in the hydraulic shovel 1.

Figure 4:
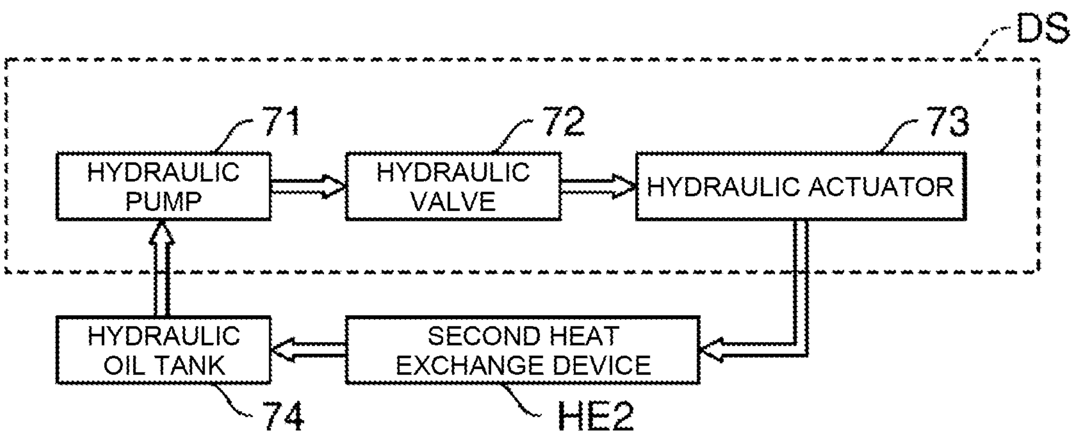
FIG. 4 An explanatory view showing a hydraulic oil circulation path in the above hydraulic shovel.

FIG. 4 is an explanatory view showing the circulation path of the hydraulic oil. The hydraulic oil circulates through the hydraulic pump 71, the hydraulic valve 72, the hydraulic actuator 73, the second heat exchange device HE2, and the hydraulic oil tank 74, in that order. In the second heat exchange device HE2, the hot hydraulic oil supplied from the hydraulic actuator 73 is cooled by blown air from the cooling fan F, and is returned to the hydraulic oil tank 74. At high temperature, the hydraulic oil degrades in property (for example, viscosity), resulting in degraded performance of lubrication and the like. Therefore, cooling the hydraulic oil in the second heat exchange device HE2 can suppress the performance degradation of the hydraulic oil.

The hydraulic pump 71, the hydraulic valve 72, and the hydraulic actuator 73 are used together with the driving system power feeder 61, the inverter 62, the electric motor 63, and the electric water pump 65 included in the driving system DS. Therefore, the hydraulic pump 71, the hydraulic valve 72, and the hydraulic actuator 73 are also included in the driving system DS that drives the machine body BA (see FIG. 1). That is, the driving system DS includes the electric motor 63, the hydraulic pump 71 driven by the electric motor 63, and the hydraulic actuator 73 driven by the hydraulic oil supplied from the hydraulic pump 71. The heat exchange device HE (second heat exchange device HE2) performs heat exchange for the hydraulic oil.

(Cooling Fan)

The cooling fan F is placed on the electric motor 63 side with respect to the heat exchange device HE, and blows air toward the heat exchange device HE (the first heat exchange device HE1 and the second heat exchange device HE2). The above cooling fan F includes a motor driven by electric power supplied from the above fan drive power supply 54, and a rotary fan rotated by the above motor. The air blown to the heat exchange device HE by the cooling fan F and warmed by the heat exchange with the cooling water and hydraulic oil is discharged to the outside of the engine chamber 44 via a slit (not shown) provided in the side wall or top face of the engine chamber 44.

In the present embodiment, it is so configured that the single cooling fan F blows air to both of the first heat exchange device HE1 and the second heat exchange device HE2, but it may be so configured to blow air to only one of the first heat exchange device HE1 and the second heat exchange device HE2. For example, it may be so configured that, when the first heat exchange device HE1 and the second heat exchange device HE2 are so placed as to be spaced apart in the engine chamber 44, the cooling fan F is provided for each of the first heat exchange device HE1 and the second heat exchange device HE2, and each cooling fan F blows air separately to one of the first heat exchange device HE1 and the second heat exchange device HE2.

That is, the heat exchange device HE that is subject to the air blowing by the single cooling fan F may be both of the first heat exchange device HE1 and the second heat exchange device HE2, may be only the first heat exchange device HE1, or may be only the second heat exchange device HE2. In this case, it can be said that the cooling fan F is configured to blow air toward the heat exchange device HE that performs the heat exchange for at least one of the cooling water and the hydraulic oil.

That is, the hydraulic shovel 1 as the electric construction machine is provided with the cooling fan F that sends air for cooling the heat exchange device HE.

Methods of cooling by the cooling fan F include a suction method and a discharge method. The suction method is a method of suctioning air from outside to inside thereby to cool the heat exchange device HE. Therefore, in the suction method, air flows outside the hydraulic shovel 1, the cooling fan F, the heat exchange device HE, inside, and outside, in that order. In contrast, the discharge method is a method in which air is once suctioned in from the outside, and is discharged internally to the heat exchange device HE by the cooling fan F. Therefore, in the discharge system, air flows outside the hydraulic shovel 1, inside, the cooling fan F, the heat exchange device HE, outside, in that order. In the present embodiment, any of the suction and discharge methods can be used as the cooling method by the cooling fan F.

[3. Configuration of Control System]

Figure 5:
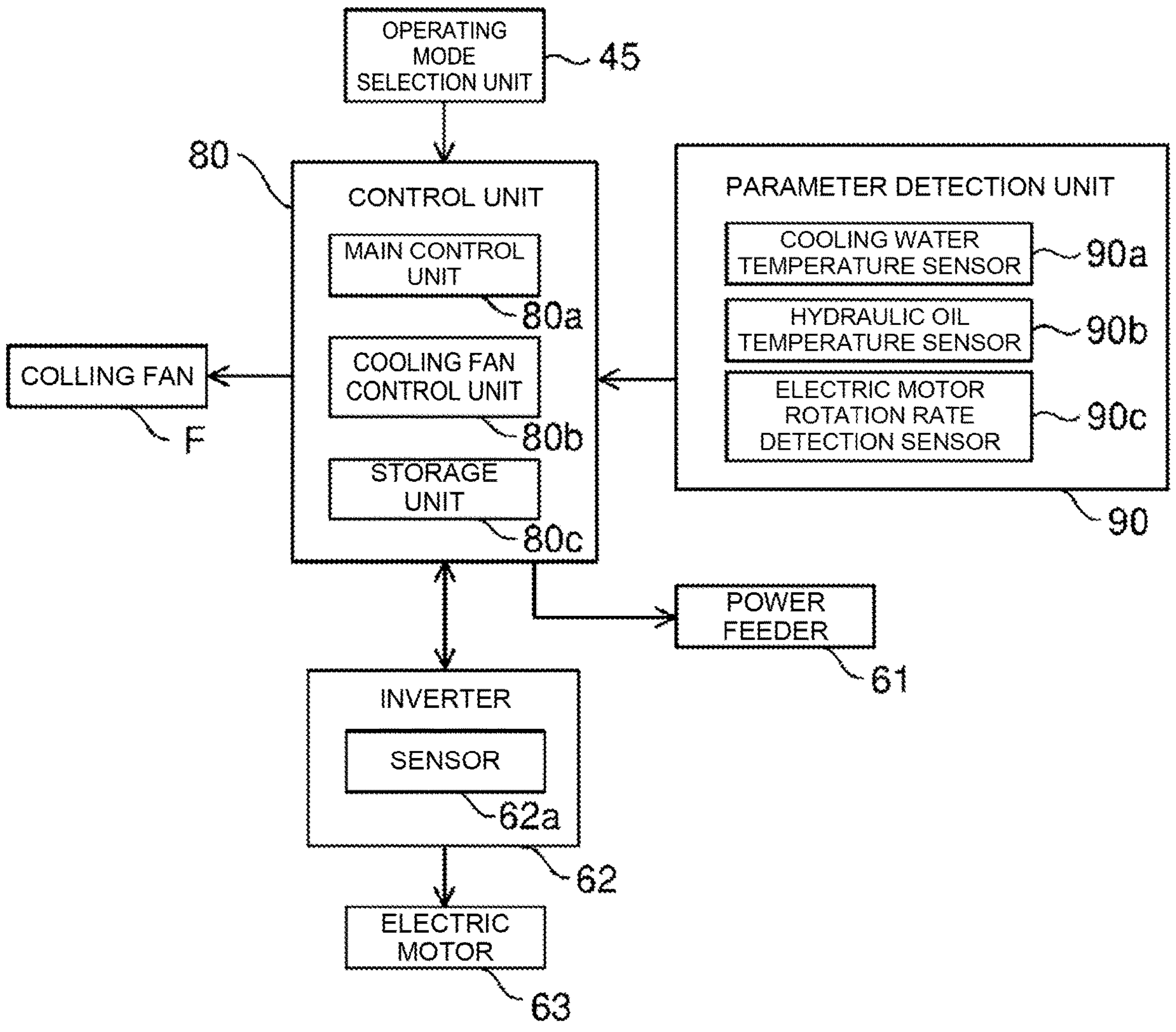
FIG. 5 A block diagram schematically showing a configuration of a control system of the above hydraulic shovel.

FIG. 5 is a block diagram schematically showing a configuration of a control system of the hydraulic shovel 1. The hydraulic shovel 1 is provided with an operating mode selection unit 45, a control unit 80, a parameter detection unit 90, in addition to the above configuration.

(Operating Mode Selection Unit)

The operating mode selection unit 45 is placed around the operator seat 41*a* in FIG. 1, and is operated by the operator so as to select the operating mode of the electric motor 63. This operating mode selection unit 45 is configured to include, for example, a key, a push button, a lever, and a touch screen display. The operating mode of the electric motor 63 can be set and switched by turning a key, turning on/off a push button, operating the lever, or inputting an instruction by the touch screen.

Here, the operating modes of the electric motor 63 include a driving mode and a charging mode. The driving mode is an operating mode in which the power supplied from the battery 53 alone, or from both of the commercial power source 51 and the battery 53 drives the electric motor 63 thereby to drive the driving system DS. In the driving mode, driving the electric motor 63 drives the hydraulic pump 71 thereby to supply the hydraulic oil to the hydraulic actuator 73. This can drive the hydraulic actuator 73.

Meanwhile, the charging mode is an operating mode in which, with the driving system DS stopped from being driving, the battery 53 which stores power is charged. In the charging mode, the power is supplied from the commercial power source 51 via the power feeder 61 to the battery 53. This charges the battery 53.

Thus, the operating modes include the driving mode that drives the driving system DS, and the charging mode in which, with the driving system DS stopped from being driving, the battery 53 which stores power is charged.

(Control Unit)

The control unit 80 includes an electronic control unit called an ECU (Electronic Control Unit). The control unit 80 includes a main control unit 80*a*, a cooling fan control unit 80*b*, and a storage unit 80*c*. The main control unit 80*a* and the cooling fan control unit 80*b* include a common CPU (Central Processing Unit), for example, but may also be configured with separate CPUs.

In the hydraulic shovel 1, the main control unit 80*a* controls the operation of each part other than the cooling fan F. A cooling fan control unit 82 controls the cooling fan F's rotation according to the operating mode of the driving system DS. That is, the hydraulic shovel 1 is provided with the cooling fan control unit 82 that controls the cooling fan F's rotation according to the operating mode set (by the operating mode selection unit 45). Details of the cooling fan F's rotation control by the cooling fan control unit 82 are described below. The cooling fan control unit 82 includes a drive circuit that sends, to the cooling fan F, a drive signal that rotates the cooling fan F.

The storage unit 80*c* stores operation programs of the main control unit 80*a* and cooling fan control unit 80*b*, as well as various information such as a table to be described below. The above storage unit 80*c* is so configured as to include a RAM (Random Access Memory), a ROM (Read Only Memory), and the like.

(Parameter Detection Unit)

The parameter detection unit 90 detects a parameter that changes according to the driving system DS's driving state. The parameters include the cooling water's temperature, the hydraulic oil's temperature, the electric motor 63's rotation rate, and the like. To detect these parameters, the parameter detection unit 90 is so configured as to include a cooling water temperature sensor 90*a*, a hydraulic oil temperature sensor 90*b*, and an electric motor rotation rate detection sensor 90*c*.

The cooling water temperature sensor 90*a* is a sensor that detects the cooling water's temperature. The cooling water temperature sensor 90*a* is installed at an inlet of the power feeder 61, for example, but is not limited to the inlet of the power feeder 61, as long as being installed at a position which is in the cooling water's circulation path shown in FIG. 3 and in which the cooling water's temperature can be detected.

The hydraulic oil temperature sensor 90*b* is a sensor that detects the hydraulic oil's temperature. The hydraulic oil temperature sensor 90*b* is installed inside the hydraulic oil tank 74, for example, but is not limited to inside the hydraulic oil tank 74, as long as being installed at a position which is in the circulation path shown in FIG. 4 and in which the hydraulic oil's temperature can be detected.

The cooling water temperature sensor 90*a* and the hydraulic oil temperature sensor 90*b* include thermistors, for example, but may also include other sensors (for example, thermocouples, resistance temperature detectors, etc.).

The electric motor rotation rate detection sensor 90*c* is a sensor that detects the electric motor 63's rotation rate itself. The electric motor rotation rate detection sensor 90*c* is composed of a resolver, an encoder, a Hall element, etc. The cooling fan control unit 80*b* calculates the cooling fan F's rotation rate based on a value detected by the electric motor rotation rate detection sensor 90*c*, and outputs the cooling fan F's rotation rate as a CAN (Controller Area Network) communication signal, but is not limited to this configuration.

The inverter 62 has an internal sensor 62*a*, and calculates the power from the voltage and current detected by the sensor 62*a*, and outputs the power. The power output by the inverter 62 also constitutes a parameter that changes according to the driving system DS's driving state.

Here, as the electric motor 63's rotation rate increases, for example, the heat volume generated by the electric motor 63 increases, and the heat volume generated by the hydraulic actuator 73 that uses the electric motor 63 as its power source also increases. Due to this, the heat transferred from the electric motor 63 increases the cooling water's temperature, and the heat transferred from the hydraulic actuator 73 increases the hydraulic oil's temperature. Increasing of the electric motor 63's rotation rate naturally increases also the inverter 62's output that supplies power to the electric motor 63.

Therefore, by the parameter detection unit 90 detecting, as parameters, the cooling water's temperature, the hydraulic oil's temperature, or the electric motor 63's rotation rate, or by the inverter 62 calculating and acquiring the output power, the cooling fan control unit 80*b* can, based on the above parameters, determine the driving state (low/high load, driving/stopped) of the driving system DS (for example, the electric motor 63).

As described above, the cooling water's temperature, the hydraulic oil's temperature, the electric motor 63's rotation rate, and the inverter 62's output change according to the heat generation state of the driving system DS (for example, the electric motor 63). Therefore, it can be said that the driving system DS's driving state is detected by the parameters (cooling water's temperature, hydraulic oil's temperature, electric motor 63's rotation rate, and inverter 62's output) that change depending on the heat generation state of the driving system DS.

[4. Cooling Fan's Rotation Control]

In the present embodiment, the cooling fan control unit 80*b* controls the cooling fan F's rotation based on the parameters in each of the driving mode and the charging mode. The following is an explanation about the cooling fan F's rotation control in each operating mode.

<A. Cooling Fan's Rotation Control in Driving Mode>

When the operating mode selection unit 45 selects the driving mode as the driving system DS (for example, electric motor 63)'s operating mode, the cooling fan control unit 80*b* controls the cooling fan F's rotation rate C in the driving mode based on a parameter (for example, one of cooling water's temperature, hydraulic oil's temperature, electric motor 63's rotation rate, and inverter 62's output) detected in the driving mode. For more details, see below.

(A-1. Cooling Fan's Rotation Control Based on Cooling Water's Temperature)

Figure 6:
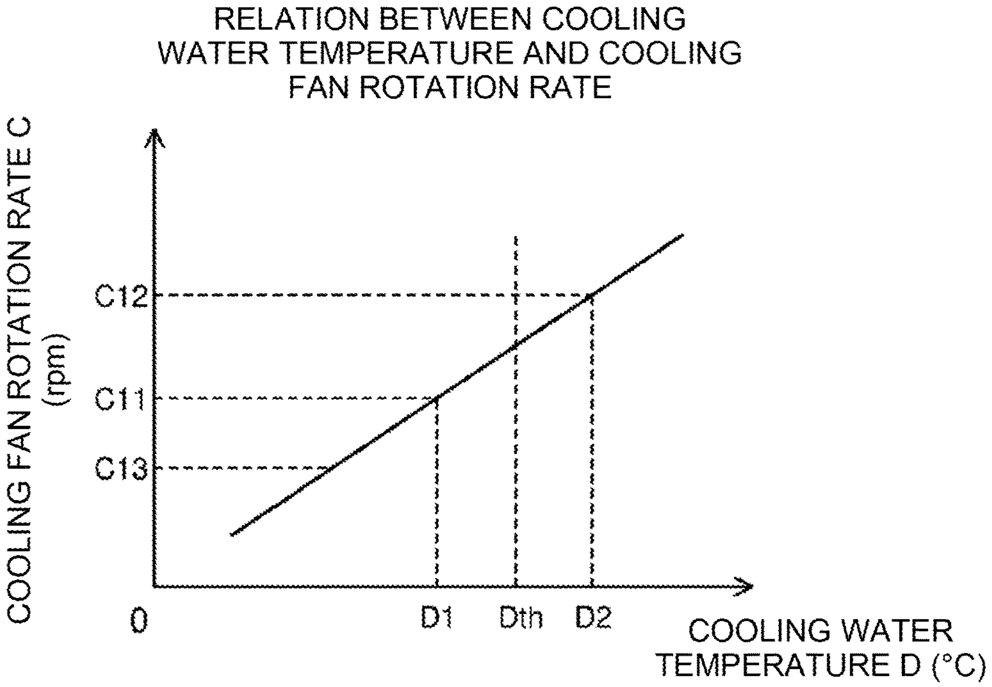
FIG. 6 A graph showing a relation between the above cooling water's temperature and a cooling fan's rotation rate.

FIG. 6 is a graph showing a relation between the cooling water's temperature D (° C.), and the cooling fan F's rotation rate C (rpm: revolutions per minute, 1 rpm=1/60 s−1) to be controlled (targeted) in the driving mode relative to the cooling water's temperature D. There is a substantially linear relation between the cooling water's temperature D and the cooling fan F's targeted rotation rate C. In the present embodiment, the storage unit 80*c* of the control unit 80 preliminarily stores, in a state of a table, the relation shown in FIG. 6.

In the driving mode, the cooling fan control unit 80*b*, from the cooling water's temperature D detected by the cooling water temperature sensor 90*a*, calculates the cooling fan F's rotation rate C based on the table in FIG. 6, and rotates the cooling fan F at the calculated rotation rate C. For example, in the driving mode, when the cooling water temperature sensor 90*a* detects a cooling water's temperature D1 (° C.), the cooling fan control unit 80*b*, from the table in FIG. 6, calculates the cooling fan F's rotation rate C11 (rpm) that corresponds to the temperature D1, and rotates the cooling fan F at the calculated rotation rate C11. Further, for example, in the driving mode, when the cooling water temperature sensor 90*a* detects a cooling water's temperature D2 (° C.) (>D1), the cooling fan control unit 80*b* calculates, from the table in FIG. 6, the cooling fan F's rotation rate C12 (rpm) (>C11) that corresponds to the temperature D2, and rotates the cooling fan F at the calculated rotation rate C12.

(A-2. Cooling Fan's Rotation Control Based on Hydraulic Oil's Temperature)

Figure 7:
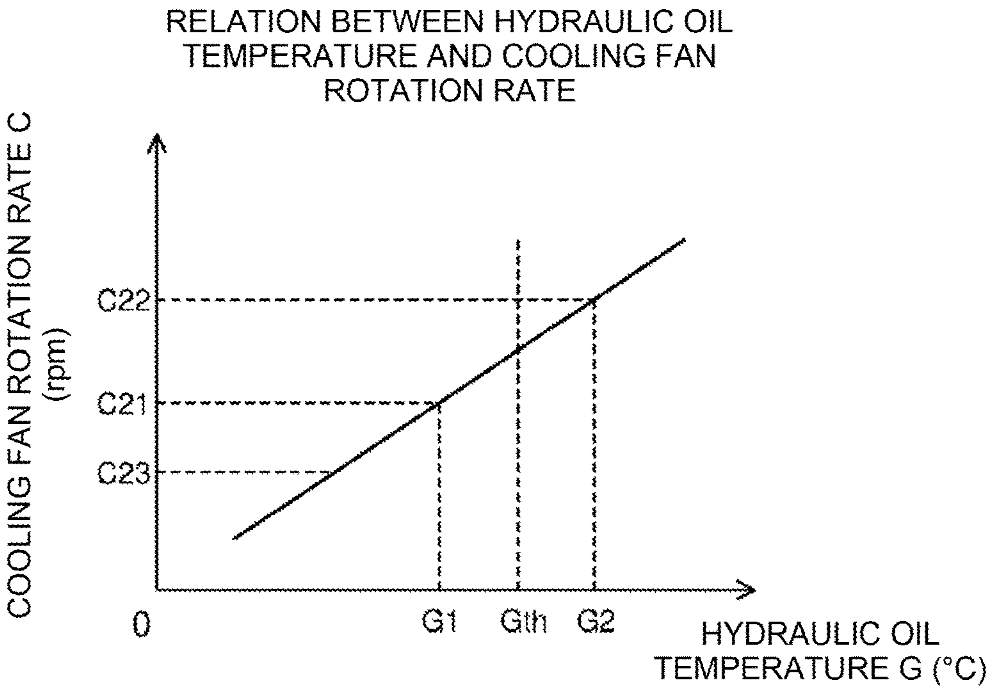
FIG. 7 A graph showing a relation between the above hydraulic oil's temperature and the cooling fan's rotation rate.

FIG. 7 is a graph showing a relation between a hydraulic oil's temperature G (° C.), and the cooling fan F's rotation rate C to be controlled in the driving mode relative to the hydraulic oil's temperature G. There is a substantially linear relation between the hydraulic oil's temperature G and the cooling fan F's targeted rotation rate C. In the present embodiment, the storage unit 80*c* of the control unit 80 preliminarily stores, in a state of a table, the relation shown in FIG. 7.

In the driving mode, the cooling fan control unit 80*b*, from the hydraulic oil's temperature G detected by the hydraulic oil temperature sensor 90*b*, calculates the to-be-controlled cooling fan F's rotation rate C based on the table in FIG. 7, and rotates the cooling fan F at the calculated rotation rate C. For example, in the driving mode, when the hydraulic oil temperature sensor 90*b* detects a hydraulic oil's temperature G1 (° C.), the cooling fan control unit 80*b*, from the table in FIG. 7, calculates the cooling fan F's rotation rate C21 (rpm) that corresponds to the temperature G1, and rotates the cooling fan F at the calculated rotation rate C21. Further, for example, in the driving mode, when the hydraulic oil temperature sensor 90*b* detects a hydraulic oil's temperature G2 (° C.) (>G1), the cooling fan control unit 80*b*, from the table in FIG. 7, calculates the cooling fan F's rotation rate C22 (rpm) (>C21) that corresponds to the temperature G2, and rotates the cooling fan F at the calculated rotation rate C22.

(A-3. Cooling Fan's Rotation Control Based on Electric Motor's Rotation Rate)

Figure 8:
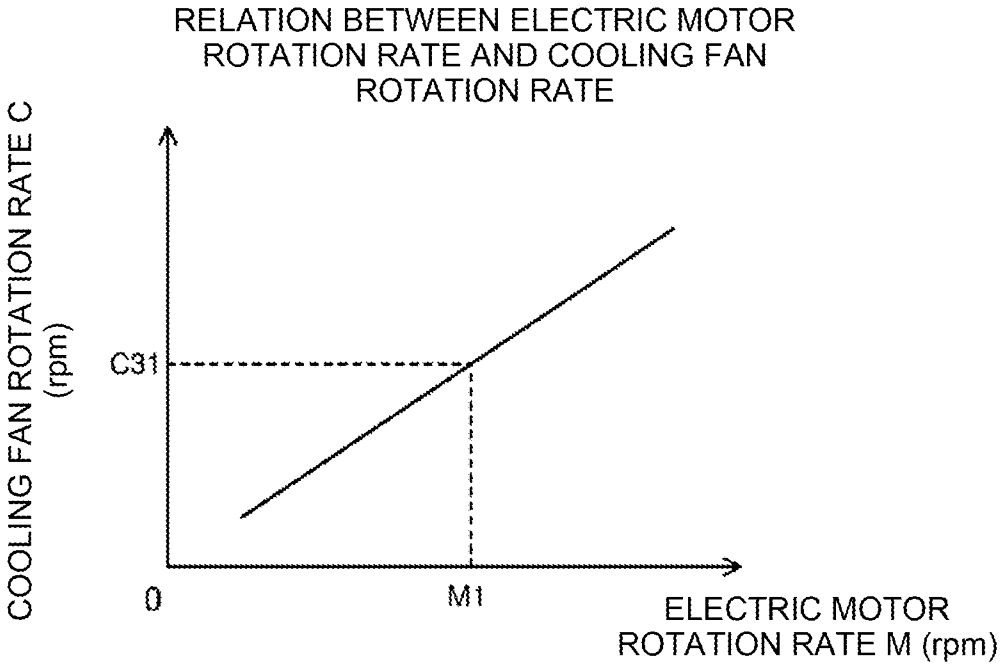
FIG. 8 A graph showing a relation between the rotation rate of an electric motor of the hydraulic shovel and the cooling fan's rotation rate.

FIG. 8 is a graph showing a relation between the electric motor's rotation rate M (rpm), and the cooling fan F's rotation rate C to be controlled in the driving mode relative to the rotation rate M. There is a substantially linear relation between the electric motor's rotation rate M and the cooling fan F's targeted rotation rate C. In the present embodiment, the storage unit 80*c* of the control unit 80 preliminarily stores, in a state of a table, the relation shown in FIG. 8.

In the driving mode, the cooling fan control unit 80*b*, from the electric motor 63's rotation rate M detected by the electric motor rotation rate detection sensor 90*c*, calculates the cooling fan F's rotation rate C based on the table in FIG. 8, and rotates the cooling fan F at the calculated rotation rate C. For example, in the driving mode, when the electric motor rotation rate detection sensor 90*c* detects the electric motor 63's rotation rate M1 (rpm), the cooling fan control unit 80*b*, from the table in FIG. 8, calculates the cooling fan F's rotation rate C31 (rpm) that corresponds to the rotation rate M1, and rotates the cooling fan F at the calculated rotation rate C31.

(A-4. Cooling Fan's Rotation Control Based on Inverter's Output)

Figure 9:
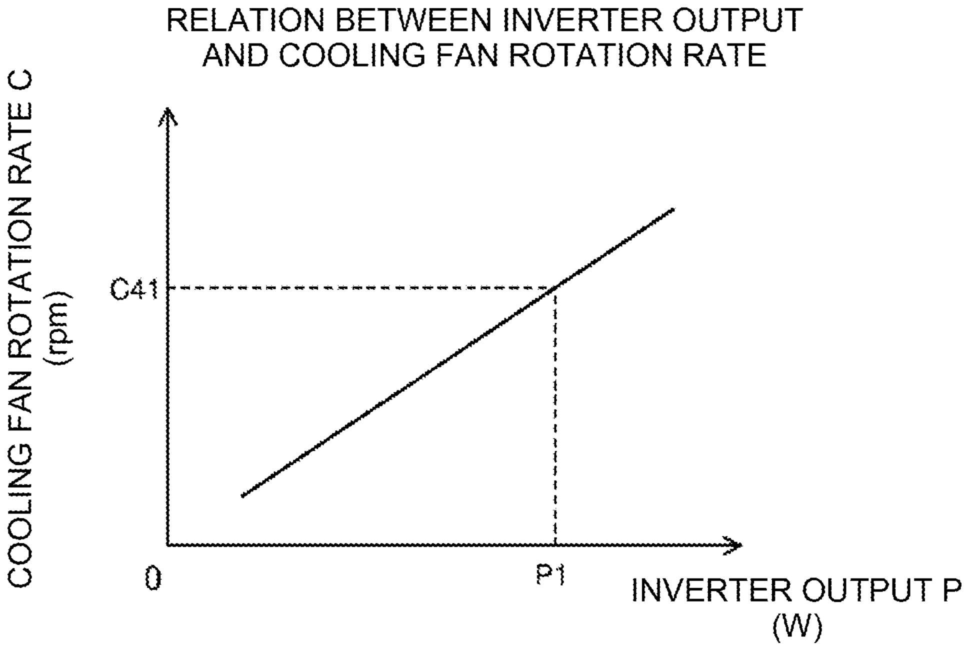
FIG. 9 A graph showing a relation between output of an inverter possessed by the hydraulic shovel and the above cooling fan's rotation rate.

FIG. 9 is a graph showing a relation between the inverter 62's output P (W), and the cooling fan F's rotation rate C to be controlled in the driving mode relative to the output P. There is a substantially linear relation between the inverter 62's output P and the cooling fan F's targeted rotation rate C. In the present embodiment, the storage unit 80*c* of the control unit 80 preliminarily stores, in a state of a table, the relation shown in FIG. 9.

In the driving mode, the cooling fan control unit 80*b*, from the inverter 62's output P, calculates the cooling fan F's rotation rate C based on the table in FIG. 9, and rotates the cooling fan F at the calculated rotation rate C. For example, in the driving mode, when the inverter 62 detects an output P1 (W), the cooling fan control unit 80*b*, from the table in FIG. 9, calculates the cooling fan F's rotation rate C41 (rpm) that corresponds to the output P, and rotates the cooling fan F at the calculated rotation rate C41 (rpm).

The cooling fan control unit 80*b* selects one of the four parameters (cooling water's temperature D, hydraulic oil's temperature G, electric motor 63's rotation rate M, and inverter 62's output P), and can control the cooling fan F's rotation rate C based on the selected one parameter.

Thus, in the driving mode, the cooling fan control unit 80*b* controls the cooling fan F's rotation rate C based on the parameters that change according to the heat generation state of the driving system DS (for example, electric motor 63). This allows the driving mode to accomplish the cooling fan F's rotation control that corresponds to the driving system DS's driving state. That is, the driving mode changes the cooling fan F's rotation rate C according to the driving state of the electric motor 63, making it possible to rotate the cooling fan F without causing excess or deficiency to the rotation rate C. Therefore, insufficient cooling of the cooling water or insufficient cooling of the hydraulic oil in the heat exchange device HE due to insufficient rotation of the cooling fan F can be suppressed from being occurring. As a result, while suppressing the occurrence of a failure attributable to the heat generated by the electric motor 63 and suppressing the performance degradation attributable to the hydraulic oil's high temperature, rotating the cooling fan F at the minimum required rotation rate C can suppress power consumption to the minimum required.

It is preferable that, in particular, the cooling fan control unit 80*b* should control the cooling fan F's rotation rate C in the driving mode based on the cooling medium's temperature as a parameter. The cooling medium may be cooling water, for example, but oil may also be used as described above.

The electric motor 63's rotation rate M and the inverter 62's output P can rapidly change in a short time, but the cooling medium's temperature (for example, cooling water's temperature D) smoothly changes according to the driving state of the electric motor 63 and does not rapidly change in a short time. Therefore, in the driving mode, controlling the cooling fan F's rotation rate C based on the cooling medium's temperature makes it relatively easy to control the cooling fan F's rotation.

The above has described the example in which, in the driving mode, the cooling fan control unit 80*b* controls the cooling fan F's rotation rate C based on any one of the plural parameters, but it is also possible to control the cooling fan F's rotation rate C by combining the plural parameters. For example, the cooling fan control unit 80*b* may control the cooling fan F's rotation rate C in the driving mode, based on both of the cooling medium (for example, cooling water)'s temperature D and the hydraulic oil's temperature G, as parameters. In this case, it is possible to set the cooling fan F's rotation rate C which is effective in sufficiently cooling both of the cooling water and the hydraulic oil.

It is assumed that, for example, in the driving mode, the cooling water's temperature detected by the cooling water temperature sensor 90*a* is D1 and the hydraulic oil's temperature detected by the hydraulic oil temperature sensor 90*b* is G1. Then, it is assumed that, the rotation rate C11 that corresponds to the temperature D1 is higher than the rotation rate C21 that corresponds to the hydraulic oil's temperature G1. In this case, the cooling fan control unit 80*b* controls the cooling fan F's rotation rate C in the driving mode to any higher (for example, C11) of the rotation rate (C11) that corresponds to the cooling medium's temperature (for example, D1), and the rotation rate (for example, C21) that corresponds to the hydraulic oil's temperature (for example, G1).

In this case, rotating of the cooling fan F at the rotation rate C11 can acquire both of the cooling water's cooling effect and the hydraulic oil's cooling effect. In particular, for the hydraulic oil, the cooling effect is more promoted because the cooling fan F rotates at the rotation rate C11 higher than the rotation rate C21 required for cooling; however, when the hydraulic oil's cooling effect (effect of suppressing performance degradation due to hydraulic oil's high temperature) is prioritized over the effect of reducing power consumption, the above cooling fan F's rotation control is very effective.

<B. Cooling Fan's Rotation Control in Charging Mode>

Next, the cooling fan F's rotation control in the charging mode is to be explained. Also explained includes the operating mode's transition from the driving mode to the charging mode.

(B-1. Rotation Control Based on Cooling Water's Temperature)

Figure 10:
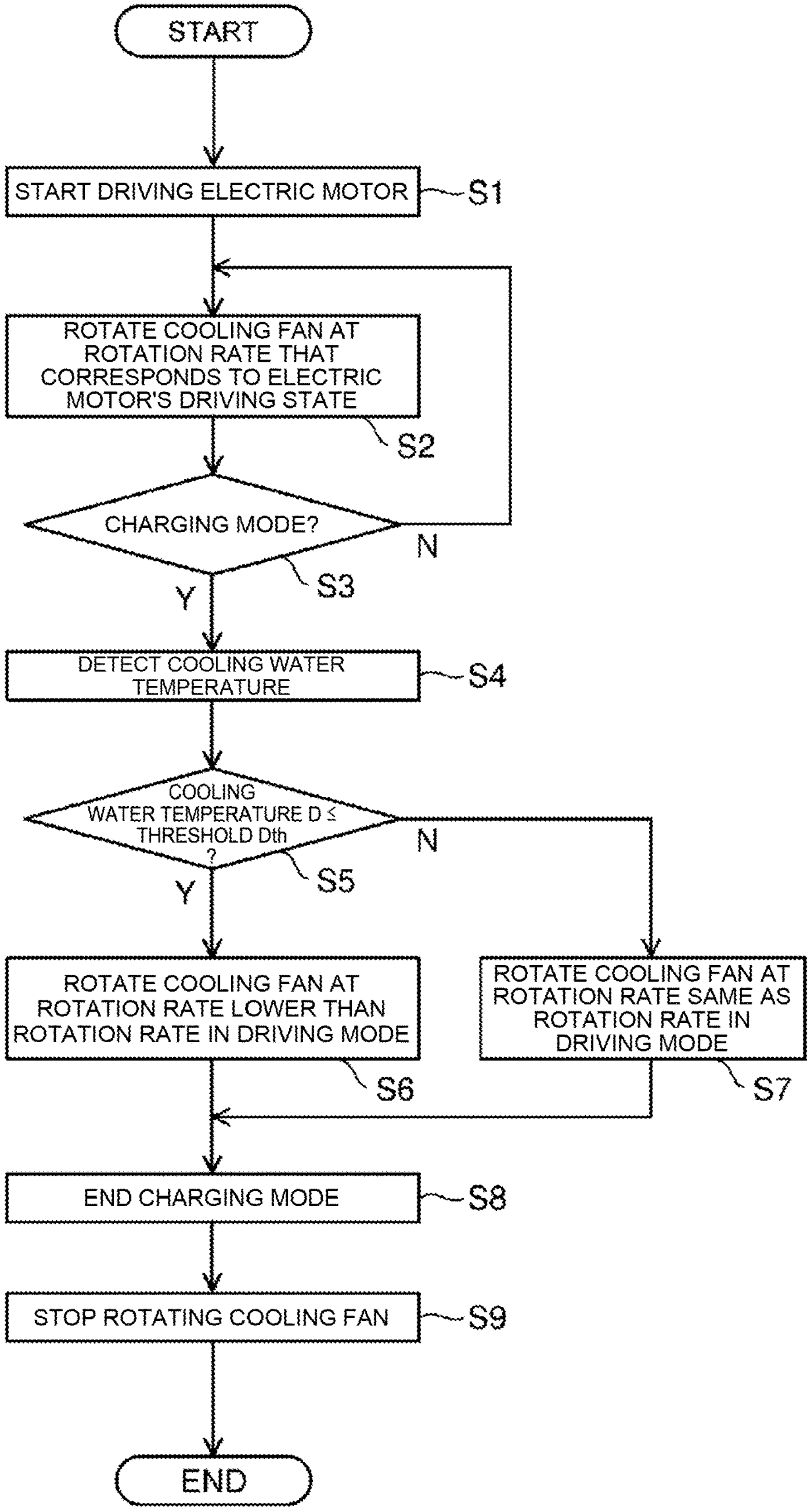
FIG. 10 A flowchart showing, from a driving mode to a charging mode, the flow of operations by the cooling fan's rotation control that is based on the above cooling water's temperature.

FIG. 10 is a flowchart showing, from the driving mode to the charging mode, the flow of operations by the cooling fan F's rotation control that is based on the cooling water's temperature D. With the driving of the electric motor 63 started (S1), in the driving mode, the cooling fan F's rotation control that is based on the cooling water's temperature D, for example, is executed. This rotates the cooling fan F at a rotation rate that corresponds to the driving state of the electric motor 63 (S2). Failing to select the charging mode by the operating mode selection unit 45 (No in S3) continuously executes the cooling fan F's rotation control in S2.

After an elapse of a predetermined time (for example, t11 (min)) since the start of driving the electric motor 63, selecting the charging mode by the operating mode selection unit 45 (Yes in S3) stops the electric motor 63's driving and the process enters the charging mode. Then, the parameter detection unit 90 (for example, cooling water temperature sensor 90*a*) detects the cooling water's temperature D, as in the driving mode (S4). The timing for detecting the cooling water's temperature D in the charging mode may be immediately after the process entering the charging mode or after a predetermined time (for example, several seconds) has elapsed since the process entering the charging mode.

Then, the cooling fan control unit 80*b* determines whether or not the cooling water's temperature D detected by the cooling water temperature sensor 90*a* is less than or equal to a predetermined threshold (cooling water threshold Dth (° C.)) (S5).

For example, when the cooling water's temperature detected in the charging mode is D1 and, as shown in FIG. 6, the temperature D1 is less than or equal to the cooling water threshold Dth (Yes in S5), the cooling fan control unit 80*b* sets the cooling fan F's rotation rate C to a rotation rate (for example, C13 (rpm)) that is lower than the rotation rate (for example, the rotation rate C11 that corresponds to the temperature D1) controlled in the driving mode, and rotates the cooling fan F at the rotation rate C13 (S6). That is, the cooling fan control unit 80*b*, with the parameter (detected by the parameter detection unit 90) less than or equal to the threshold, sets, as the charging mode rotation rate, the rotation rate lower than the cooling fan F's rotation rate in the driving mode (the rotation rate that corresponds to the parameter value in the driving mode). The charging mode rotation rate means the cooling fan F's rotation rate in the charging mode (the same shall apply hereinafter).

When the cooling water's temperature D1 is lower than or equal to the cooling water threshold Dth, the cooling fan control unit 80*b* can determine that the electric motor 63 was driven at a relatively low load in the driving mode seen before the process entering the charging mode. When the electric motor 63 is driven at the low load, the heat volume generated by the electric motor 63 is small; therefore, it is deemed that, even when the cooling fan F's rotation rate is reduced in the charging mode, any failure attributable to the heat generated by the electric motor 63 is unlikely to be caused. Therefore, in this case, the cooling fan control unit 80*b* determines that the cooling fan F's rotation rate can be changed from the driving mode. Lowering the cooling fan F's rotation rate in the charging mode than in the driving mode based on the above determination can reduce the power consumed by the cooling fan F's rotation.

Meanwhile, when the cooling water's temperature detected in the charging mode is, for example, D2 and this temperature D2 is over the cooling water threshold Dth (No in S5), the cooling fan control unit 80*b* rotates the cooling fan F at the rotation rate same as the rotation rate controlled in the driving mode (for example, rotation rate C12 that corresponds to temperature D2) (S7). That is, the cooling fan control unit 80*b*, with the parameter (detected by the parameter detection unit 90) over the threshold, sets, as the charging mode rotation rate, the cooling fan F's rotation rate in the driving mode. In other words, when the parameter is over the threshold, the cooling fan control unit 80*b* maintains the cooling fan F's rotation rate in the charging mode at the cooling fan's rotation rate (which corresponds to the parameter's value) in the driving mode.

When the cooling water's temperature D2 is higher than the cooling water threshold Dth, the cooling fan control unit 80*b* can determine that the electric motor 63 was driven at a high load in the driving mode. When the electric motor 63 is driven at the high load, a failure attributable to the heat generated by the electric motor 63 is likely to occur. Therefore, in this case, the cooling fan control unit 80*b* determines that the cooling fan F's rotation rate should not be changed from the driving mode, and based on the above determination, rotates, in the charging mode, the cooling fan F at the rotation rate same as in the driving mode.

This secures, in the charging mode, the cooling fan F's blown air strength same as in the driving mode, promoting the heat exchange for the cooling water in the heat exchange device HE. Therefore, in the charging mode, the cooling effect on the cooling water can be enhanced. As a result, the situation where the electric motor 63 fails due to the heat generated in the driving mode can be reduced, making it possible to secure the safety of the device.

Other than the electric motor 63, the power feeder 61 and the inverter 62 are present in the cooling water's circulation path (FIG. 3). The power feeder 61 and the inverter 62, as well as the electric motor 63, generate heat by electric power. In particular, for inverter 62, as with the electric motor 63, the heat generation temperature increases as the work load increases. Therefore, increasing the cooling water's cooling effect as described above leads to reducing of failures attributable to the heat generated by the power feeder 61 and inverter 62.

In the configuration where the heat exchange device HE includes the second heat exchange device HE2, securing the blown air strength of the cooling fan F promotes the heat exchange of the hydraulic oil. This also enhances the cooling effect on the hydraulic oil in the charging mode, also making it possible to suppress performance degradation due to the hydraulic oil's high temperature.

Figure 11:
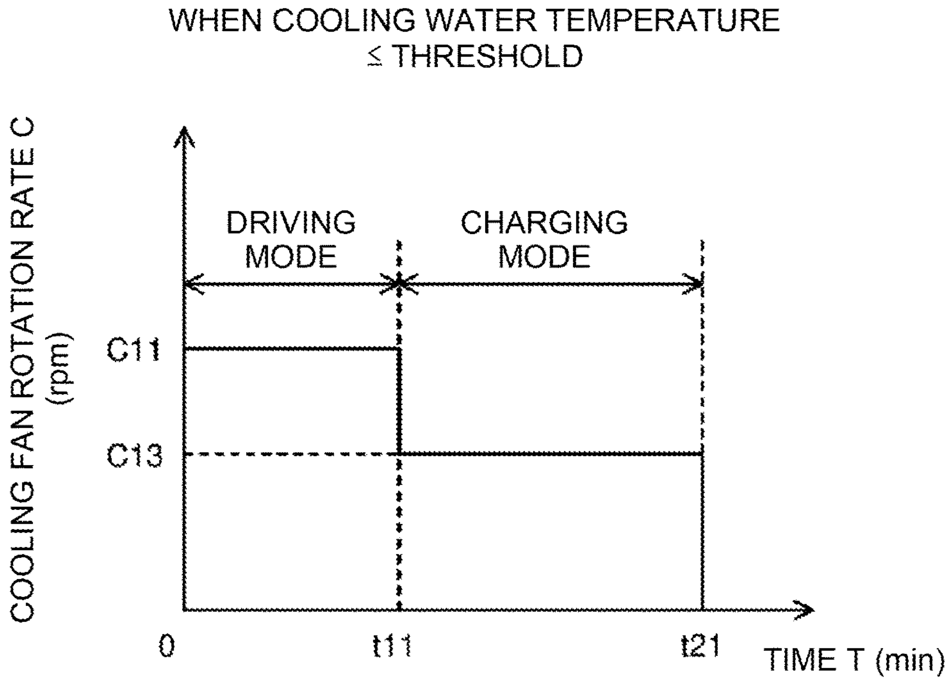
FIG. 11 A graph showing an example of a transition of the above cooling fan's rotation rate controlled based on the above cooling water's temperature.
Figure 12:
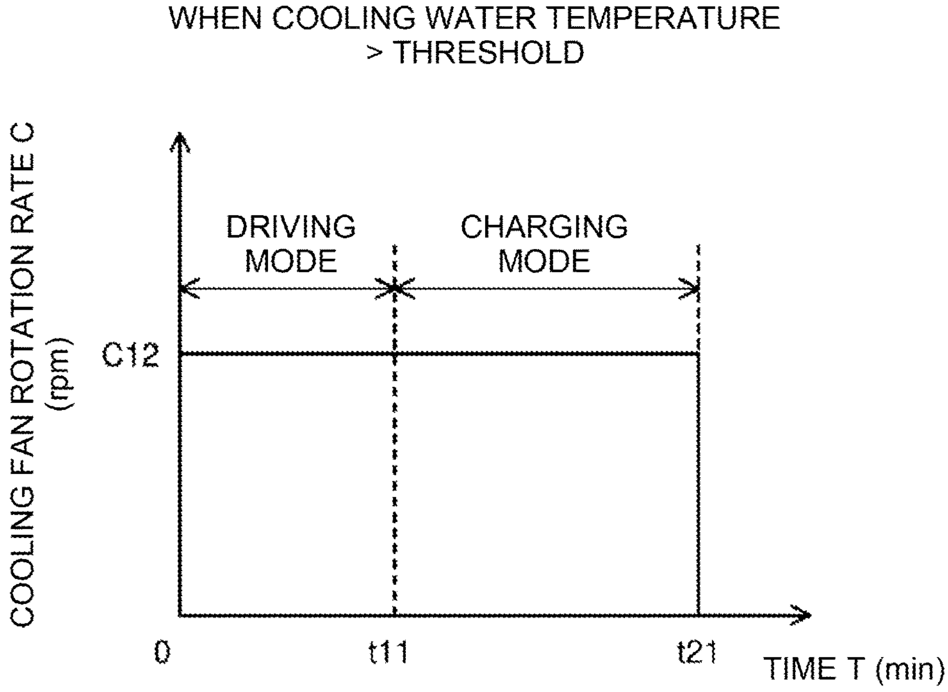
FIG. 12 A graph showing another example of the transition of the above cooling fan's rotation rate controlled based on the above cooling water's temperature.

With the charging of the battery 53 completed and the charging mode ended (S8) at the time point when a predetermined time (for example, t21 (min)) has elapsed from the start of driving the electric motor 63, the cooling fan control unit 80*b* stops the cooling fan F's rotation (S9), and ends the cooling fan F's rotation control. As a result, when the rotation control in S6 is executed, the transition of the cooling fan F's rotation rate C is as shown in FIG. 11. Meanwhile, when the rotation control in S7 is executed, the transition of the cooling fan F's rotation rate C is as shown in FIG. 12 (no change in rotation rate).

As described above, the cooling fan control unit 80*b* sets the cooling fan F's rotation rate in the charging mode to the charging mode rotation rate that corresponds to the driving system DS's driving state (in the driving mode) (S6, S7).

This can acquire the effect that corresponds to the driving system DS's driving state. For example, when the driving system DS (electric motor 63) is driven at the high load in the driving mode, the charging mode cooling fan F's rotation rate is set equivalent to the rotation rate in the driving mode, making it possible to reduce driving system DS's failures attributable to the heat generated in the driving mode. Meanwhile, when the driving system DS is driven at the low load in the driving mode, the cooling fan F's charging mode rotation rate is set to a rotation rate lower than the rotation rate in the driving mode, for example, making it possible to reduce power consumption.

In particular, in S6, the charging mode rotation rate is smaller than the cooling fan F's rotation rate in the driving mode. Therefore, driving the driving system DS at the low load can acquire the effect of reducing the power consumption.

When the parameter (for example, cooling water's temperature) is less than or equal to the threshold in the charging mode, the cooling fan control unit 80*b* sets, as the charging mode rotation rate, a rotation rate lower than the cooling fan F's rotation rate seen in the driving mode (SG). This can reduce the power consumed by the cooling fan F's rotation.

Meanwhile, when the parameter is over the threshold in the charging mode, the cooling fan control unit 80*b* sets, as the charging mode rotation rate, the cooling fan F's rotation rate in the driving mode (S7). In this case, in the charging mode, the strong blown air is maintained for the heat exchange device HE, promoting the heat exchange for the cooling water. This can increase the cooling water's cooling effect, making it possible to acquire the effect of reducing device failures or suppressing the performance degradation of the hydraulic oil.

Further, the cooling fan control unit 80*b* controls the cooling fan F's rotation rate in the charging mode based on the cooling medium's temperature (for example, cooling water's temperature D) as a parameter (S5 to S7).

As described in the cooling fan F's rotation control in the driving mode, the cooling medium's temperature smoothly changes according to the driving state of the electric motor 63, and does not rapidly change in a short time. The same is true in the charging mode, where the cooling medium's temperature smoothly changes (for example, decreases) after the electric motor 63 is stopped. Due to this, in the charging mode, the cooling fan 61's rotation rate is controlled based on the cooling medium's temperature, thereby facilitating the above control.

(B-2. Rotation Control Based on Cooling Water's Temperature and Hydraulic Oil's Temperature)

The cooling fan F's rotation control in the charging mode may be executed by using, as a parameter, the hydraulic oil's temperature G, in addition to the cooling water's temperature D.

Figure 13:
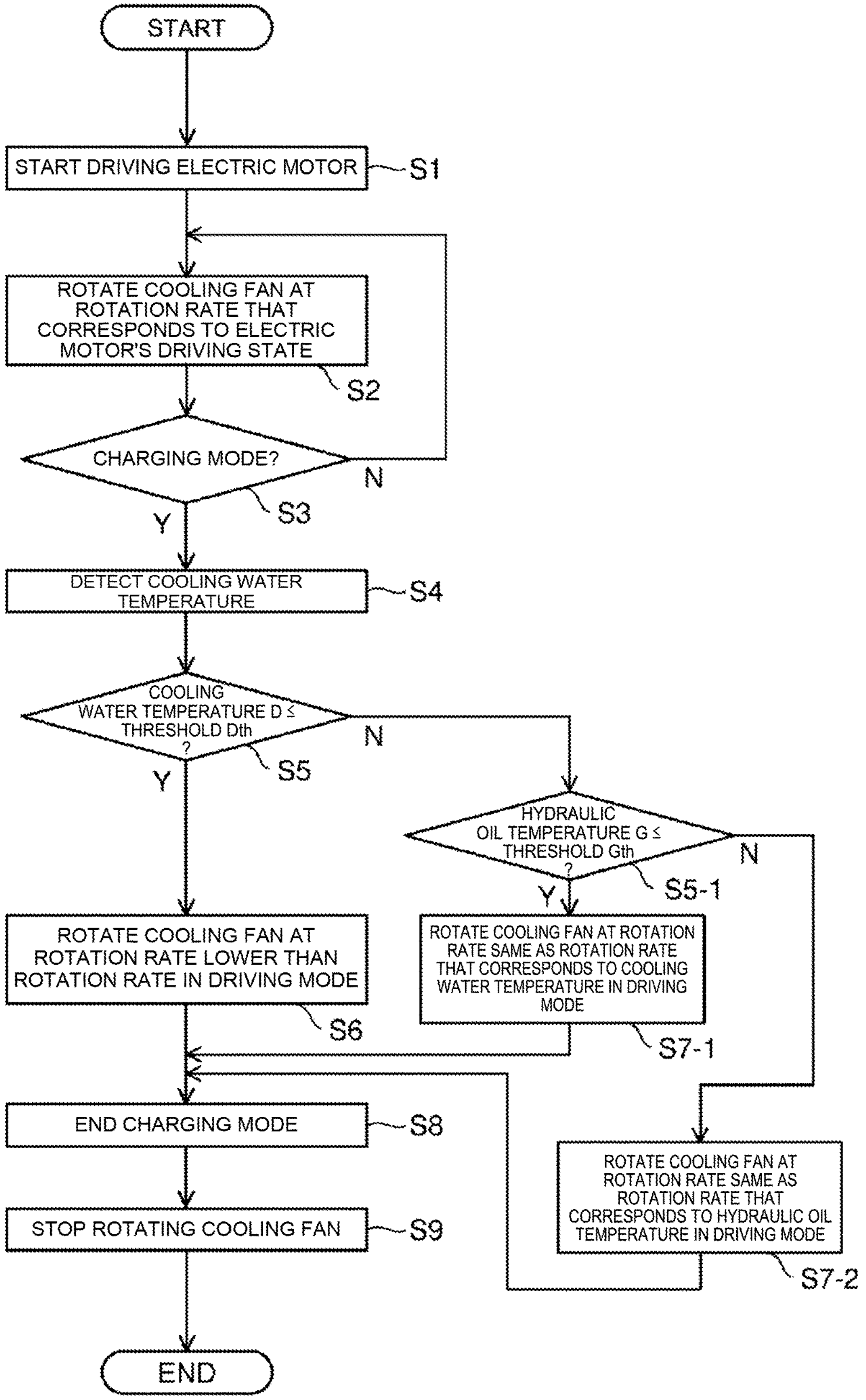
FIG. 13 A flowchart showing, from the above driving mode to the above charging mode, the flow of operations by the above cooling fan's rotation control that is based on the above cooling water's temperature and hydraulic oil's temperature.

FIG. 13 is a flowchart showing, from the driving mode to the charging mode, the flow of operations by the cooling fan F's rotation control that is based on the cooling water's temperature and hydraulic oil's temperature G. In FIG. 13, the process after No in S5 is slightly different from that in FIG. 10. The following is an explanation of the difference from FIG. 10.

No in S5, that is, when the cooling water's temperature detected in the charging mode is, for example, D2, and this temperature D2 is over the cooling water threshold Dth, the cooling fan control unit 80*b* determines whether or not the hydraulic oil's temperature G detected by the hydraulic oil temperature sensor 90*b* is less than or equal to the predetermined threshold (hydraulic oil threshold Gth (° C.)) (S5-1).

For example, when the hydraulic oil's temperature detected in the charging mode is G1, and, as shown in FIG. 7, the temperature G1 is less than or equal to the hydraulic oil threshold Gth (Yes in S5-1), the cooling fan control unit 80*b* rotates the cooling fan F at the rotation rate same as the rotation rate (for example, the rotation rate that corresponds to the temperature of the cooling water (for example, the rotation rate C12 that corresponds to the temperature D2 of the cooling water)) having been controlled in the driving mode (S7-1), and then the process moves to S8 as in FIG. 10. The process in S7-1 is substantially the same as S7 in FIG. 10.

Meanwhile, when the hydraulic oil's temperature detected in the charging mode is G2, and the temperature G2 is over the hydraulic oil threshold Gth (No in S5-1), for example, the cooling fan control unit 80*b* rotates the cooling fan F at the rotation rate same as the rotation rate (for example, the rotation rate C22 that corresponds to the temperature G2) having been controlled in the driving mode (S7-2), and then the process moves to S8 as in FIG. 10. That is, in FIG. 7-2, when the hydraulic oil's temperature G2 as a parameter is over the hydraulic oil threshold Gth as a threshold, the cooling fan control unit 80*b* sets, as the charging mode rotation rate, the cooling fan F's rotation rate C22 that corresponds to the hydraulic oil's temperature G2 in the driving mode. That is, the cooling fan control unit 80*b* maintains the cooling fan F's rotation rate at the rotation rate (for example, C22) that corresponds to the hydraulic oil's temperature (for example, G2) in the driving mode.

There is concern that the hydraulic oil may have the performance degraded at high temperature. In the charging mode, when hydraulic oil's temperature is over the hydraulic oil threshold Gth, maintaining the cooling fan F's rotation rate at the rotation rate that corresponds to the hydraulic oil's temperature in the driving mode enhances the hydraulic oil's cooling effect, making it possible to suppress the performance degradation due to the hydraulic oil's high temperature.

In the charging mode, the driving of the electric motor 63 is stopped, zeroing the electric motor 63's rotation rate M and the inverter 62's output P. Due to this, in the charging mode, the cooling fan F's rotation control, as executed in the driving mode, which is based on the electric motor 63's rotation rate M or the inverter 62's output P is not executed.

In the above, the explanation has been made about the cooling fan F's rotation control, as the cooling fan F's rotation control in the charging mode, that is based on the parameters (for example, cooling water's temperature D, hydraulic oil's temperature G) same as the parameters used in the rotation control in the driving mode; however, the cooling fan F's rotation rate C may be controlled based on a parameter different between in the driving mode and the charging mode. For example, in the driving mode, the cooling fan F's rotation rate C may be controlled based on the electric motor 63's rotation rate M, whereas in the charging mode, the cooling fan F's rotation rate C may be controlled based on the cooling water's temperature D.

Figure 14:
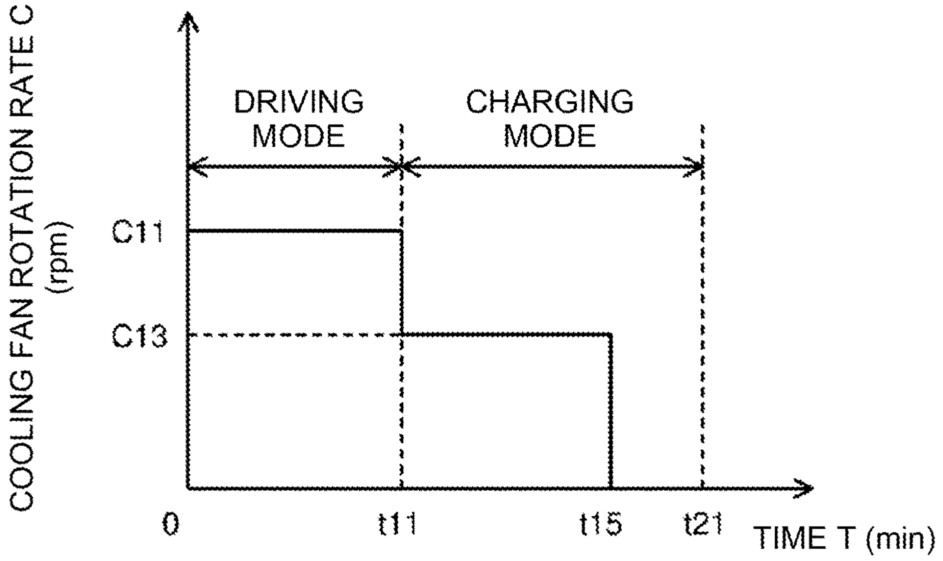
FIG. 14 A graph showing yet another example of the transition of the above cooling fan's rotation rate controlled based on the above cooling water's temperature.
Figure 15:
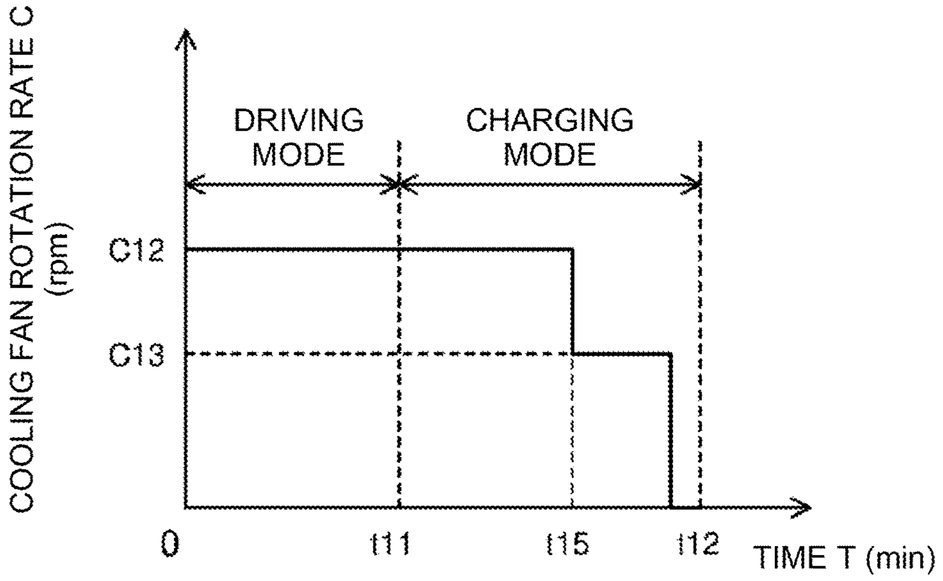
FIG. 15 A graph showing yet another example of the transition of the above cooling fan's rotation rate controlled based on the above cooling water's temperature.

In the above, the explanation has been made about the example in which the cooling fan control unit 80*b* controls the cooling fan F's rotation rate to a constant value in the charging mode, but the cooling fan F's rotation rate may be changed in steps or continuously during the period of the charging mode. For example, as shown in FIG. 14, in the charging mode, when the cooling water's temperature sufficiently drops before the charging of the battery 53 is completed, the cooling fan F's rotation may be completely stopped at that time point (for example, a time point when a predetermined time (for example, t15 (min)) has elapsed since the start of driving of the electric motor 63), or the cooling fan F's rotation rate may be decreased in steps as shown in FIG. 15. In these cases, the effect of reducing power consumption by stopping the rotation of the cooling fan F can be further enhanced compared to the controls in FIGS. 11 and 12.

In the present embodiment, the cooling fan F's rotation is stopped at the end of the charging mode; when the charging of the battery 53 is completed in a short time and the charging mode ends early, and if the cooling water's cooling effect, etc. is considered insufficient, however, it is allowed that the cooling fan F continues to rotate for a predetermined time period even after terminating of the charging mode, and the cooling fan F is stopped from rotating after an elapse of the predetermined time period.

In the present embodiment, the explanation has been made about the example in which the cooling fan control unit 80*b* controls the cooling fan F's rotation rate based on the parameter detected by the parameter detection unit 90 and based on the preset table, but the cooling fan F's rotation control is not limited to this example. For example, the cooling fan control unit 80*b* may control the cooling fan F's rotation rate while executing a feedback control (for example, PID control) so that the value of the parameter actually detected by the parameter detection unit 90 (detected value) approaches the target value.

In the present embodiment, in the cooling fan F's rotation control that is based on FIG. 6, etc., the cooling water's temperature D, etc. and the cooling fan F's rotation rate C are caused to correspond one to one thereby to control the cooling fan F's rotation rate C, but it is not necessary to control in the one-to-one correspondence. For example, it is allowed that the cooling fan F's rotation rate C one in number is assigned to a predetermined temperature range (plural temperatures) of the cooling water, and control of rotating the cooling fan F at a common rotation rate C for the temperature within the predetermined temperature range of the cooling water is executed.

In the present embodiment, the explanation has been made about the example in which the table showing the relation in FIG. 6, etc. is stored in the storage unit 80*c* of the control unit 80 (see FIG. 5), but, in the hydraulic shovel 1, the table may be stored in a storage unit different from the control unit 80. It is allowed that the above table is stored in a server (for example, a cloud server) external to the hydraulic shovel 1, and the cooling fan control unit 80*b*, by communicating with the above server, acquires information on the cooling fan F's rotation rate that corresponds to the parameter, thereby to control the cooling fan F to rotate at the acquired rotation rate.

The embodiment of the present invention has been described above, but the scope of the present invention is not limited thereto, and can be carried out within an extended or modified range without departing from the gist of the present invention.

INDUSTRIAL APPLICABILITY

The present invention is usable for an electric construction machine such as a hydraulic shovel having an electric motor driven by a battery, for example.

DESCRIPTION OF REFERENCE NUMERALS

1: hydraulic shovel (electric construction machine)
53: battery
63: electric motor
71: hydraulic pump
73: hydraulic actuator
80*b*: cooling fan control unit
90: parameter detection unit
BA: machine body
DS: driving system
F: cooling fan
HE: heat exchange device

The invention claimed is:

1. An electric construction machine, comprising:
a driving system configured to drive a machine body by electric power from a battery;
a heat exchange device configured to exchange heat of a cooling medium for cooling the driving system;
a cooling fan configured to send air for cooling the heat exchange device; and
a cooling fan control unit configured to control a rotation of the cooling fan according to a set operating mode of multiple operating modes of the driving system,
wherein the multiple operating modes include:
a driving mode in which the driving system drives the machine body, and
a charging mode in which the driving system is stopped and the battery is charged, wherein the charging mode is terminated in response to the battery becoming fully charged, wherein the cooling fan control unit is configured to:
when the driving system is in the driving mode, set a first rate of rotation of the cooling fan based on a temperature of the cooling medium while in the driving mode, and
in response to the driving system switching from the driving mode to the charging mode, set a second rate of rotation of the cooling fan based on a comparison of a temperature of the cooling medium while in the charging mode to a predetermined threshold,
wherein the second rate of rotation is greater than zero and less than the first rate of rotation when the temperature of the cooling medium while in the charging mode is less than or equal to the predetermined threshold.

2. The electric construction machine as claimed in claim 1, wherein the temperature of the cooling medium changes according to a heat generation state of the driving system.

3. The electric construction machine as claimed in claim 2, wherein, in the charging mode, the second rate of rotation is different than the first rate of rotation in response to the temperature of the cooling medium while in the charging mode being less than or equal to the predetermined threshold.

4. The electric construction machine as claimed in claim 3, wherein the second rate of rotation is less than the first rate of rotation.

5. The electric construction machine as claimed in claim 2, wherein the driving system includes:
an electric motor,
a hydraulic pump configured to be driven by the electric motor, and
a hydraulic actuator configured to be driven by hydraulic oil supplied from the hydraulic pump,
wherein the heat exchange device is configured to perform heat exchange for the hydraulic oil, and
wherein the first rate of rotation is further based on a temperature of the hydraulic oil.

6. The electric construction machine as claimed in claim 5, wherein the cooling fan control unit is configured to control, based on the temperature of the cooling medium while in the driving mode, the first rate of rotation of the cooling fan in the driving mode.

7. The electric construction machine as claimed in claim 6, wherein the cooling fan control unit is configured to control, based on the temperature of the cooling medium while in the driving mode and the temperature of the hydraulic oil while in the driving mode, the first rate of rotation of the cooling fan in the driving mode.

8. The electric construction machine as claimed in claim 7, wherein the cooling fan control unit is configured to control the first rate of rotation of the cooling fan in the driving mode to a higher of a rotation rate that corresponds to the temperature of the cooling medium and a rotation rate that corresponds to the temperature of the hydraulic oil.

9. The electric construction machine as claimed in claim 2, wherein the cooling fan control unit is configured to control, based on the temperature of the cooling medium while in the driving mode, the first rate of rotation of the cooling fan in the driving mode.

10. The electric construction machine as claimed in claim 9, wherein the first rate of rotation is further based on a temperature of a hydraulic oil while in the driving mode.

11. The electric construction machine as claimed in claim 10, wherein the cooling fan control unit is configured to control the first rate of rotation of the cooling fan in the driving mode to a higher of a rotation rate that corresponds to the temperature of the cooling medium and a rotation rate that corresponds to the temperature of the hydraulic oil.

12. The electric construction machine as claimed in claim 1, wherein, in response to switching from the driving mode to the charging mode, the second rate of rotation is set equal to:
the first rate of rotation when the temperature of the cooling medium while in the charging mode is greater than the predetermined threshold and a temperature of a hydraulic oil while in the charging mode is less than or equal to a second predetermined threshold, or
a rate of rotation corresponding to a temperature of the hydraulic oil while in the driving mode when the temperature of the hydraulic oil is greater than the second predetermined threshold.

13. The electric construction machine as claimed in claim 1, wherein the second rate of rotation is equal to the first rate of rotation when the temperature of the cooling medium while in the charging mode is greater than the predetermined threshold.

14. An electric construction machine, comprising:
a machine body;
an electric motor that drives the machine body using power from a battery;
a heat exchange device that cools the electric motor by exchanging heat with a cooling medium;
a cooling fan that cools the heat exchange device by directing air towards the heat exchange device;
a processor; and
a memory storing processor-executable code, which when executed by the processor, causes the processor to perform operations including:
controlling a rotation rate of the cooling fan according to a set operating mode of multiple operating modes of the electric motor,
wherein the multiple operating modes include a driving mode in which the electric motor drives the machine body and a charging mode in which the electric motor is stopped and the battery is charged, wherein the charging mode is terminated in response to the battery becoming fully charged,
wherein, when the electric motor is in the driving mode, controlling the rotation rate of the cooling fan is based on a temperature of the cooling medium while in the driving mode,
wherein, in response to the electric motor switching from the driving to the charging mode, controlling the rotation rate of the cooling fan is based on a comparison of a temperature of the cooling medium while in the charging mode to a predetermined threshold, and
wherein the second rate of rotation is greater than zero and less than the first rate of rotation when the temperature of the cooling medium while in the charging mode is less than or equal to the predetermined threshold.

15. The electric construction machine as claimed in claim 14, wherein, in the driving mode, a cooling fan control unit is configured to set the first rate of rotation of the cooling fan equal to a greater of a rate of rotation corresponding to the temperature of the cooling medium and a rate of rotation corresponding to a temperature of a hydraulic oil.

16. The electric construction machine as claimed in claim 15, wherein the cooling fan control unit is configured to control the first rate of rotation of the cooling fan in the driving mode to a higher of a rotation rate that corresponds to the temperature of the cooling medium and a rotation rate that corresponds to the temperature of the hydraulic oil.

17. The electric construction machine as claimed in claim 14, wherein the temperature of the cooling medium changes according to a heat generation state of the electric motor.

18. The electric construction machine as claimed in claim 14, wherein the first rate of rotation is further based on a temperature of a hydraulic oil while in the driving mode.

* * * * *